United States Patent
Sawyer et al.

(10) Patent No.: US 9,765,277 B2
(45) Date of Patent: Sep. 19, 2017

(54) MIXTURES, ARTICLES HAVING LOW COEFFICIENTS OF FRICTION, METHODS OF MAKING THESE, AND METHODS OF USING THESE

(71) Applicant: University of Florida Research Foundation, Inc., Gainesville, FL (US)

(72) Inventors: Wallace Gregory Sawyer, Gainesville, FL (US); Brandon Alexander Krick, Bethlehem, PA (US); Jeffrey John Ewin, Saint Petersburg, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 14/905,053

(22) PCT Filed: Jul. 18, 2014

(86) PCT No.: PCT/US2014/047135
§ 371 (c)(1),
(2) Date: Jan. 14, 2016

(87) PCT Pub. No.: WO2015/009989
PCT Pub. Date: Jan. 22, 2015

(65) Prior Publication Data
US 2016/0152916 A1    Jun. 2, 2016

Related U.S. Application Data

(60) Provisional application No. 61/856,085, filed on Jul. 19, 2013.

(51) Int. Cl.
| | |
|---|---|
| C10M 169/04 | (2006.01) |
| C10M 107/38 | (2006.01) |
| C10M 125/10 | (2006.01) |
| C10M 125/30 | (2006.01) |
| F16C 33/20 | (2006.01) |

(52) U.S. Cl.
CPC ........ C10M 169/04 (2013.01); C10M 107/38 (2013.01); C10M 125/10 (2013.01);
(Continued)

(58) Field of Classification Search
CPC .............. C10M 103/02; C10M 107/38; C10M 125/26; C10M 125/30; C10M 125/10; C10M 169/04; C10M 2201/062; C10M 2201/0623; C10M 2201/102; C10M 2201/1023; C10M 2201/103;
(Continued)

(56) References Cited

U.S. PATENT DOCUMENTS 4,115,283 A * 9/1978 Needham ................. C10M 7/00
508/107
4,777,204 A 10/1988 Ikenaga et al.
(Continued)

OTHER PUBLICATIONS

International Search Report for PCT/US2014/047135 mailed Oct. 24, 2014.

*Primary Examiner* — James Goloboy
(74) *Attorney, Agent, or Firm* — Thomas Horstemeyer, LLP

(57) ABSTRACT

Embodiments of the present disclosure provide for mixtures, methods for making mixtures, articles, methods for making articles, and methods of using articles.

13 Claims, 4 Drawing Sheets

(52) U.S. Cl.
CPC ......... *C10M 125/30* (2013.01); *F16C 33/201* (2013.01); *C10M 2201/062* (2013.01); *C10M 2201/0623* (2013.01); *C10M 2201/102* (2013.01); *C10M 2201/103* (2013.01); *C10M 2201/1023* (2013.01); *C10M 2201/1033* (2013.01); *C10M 2213/0623* (2013.01); *C10N 2230/06* (2013.01); *C10N 2250/18* (2013.01); *F16C 2208/32* (2013.01)

(58) Field of Classification Search
CPC .. C10M 2201/1033; C10M 2213/0623; C10N 2230/06; C10N 2250/18; F16C 33/201; F16C 2208/32
USPC ........................................................ 508/138
See application file for complete search history.

(56) References Cited

U.S. PATENT DOCUMENTS

| | | |
|---|---|---|
| 5,035,723 A | 7/1991 | Kalinowski et al. |
| 7,314,646 B2 | 1/2008 | Sawyer et al. |
| 2003/0160446 A1* | 8/2003 | Goto .................... C10M 103/02 285/94 |
| 2008/0220997 A1* | 9/2008 | Eadie .................. C10M 103/00 508/113 |
| 2010/0126132 A1* | 5/2010 | Merkel .............. B01D 46/2455 55/523 |
| 2012/0184471 A1 | 7/2012 | Windrich et al. |
| 2013/0116157 A1* | 5/2013 | Mukai ................... C08G 73/10 508/108 |

* cited by examiner

MIXTURES, ARTICLES HAVING LOW COEFFICIENTS OF FRICTION, METHODS OF MAKING THESE, AND METHODS OF USING THESE

CROSS-REFERENCE TO RELATED APPLICATION

This application is the 35 U.S.C. §371 national stage application of PCT Application No. PCT/US2014/047135, filed Jul. 18, 2014, which claims priority to U.S. Provisional Application entitled "MIXTURES, ARTICLES HAVING LOW COEFFICIENTS OF FRICTION, METHODS OF MAKING THE THESE, AND METHODS OF USING THESE" having Ser. No. 61/856,085, filed on Jul. 19, 2013, both of which are incorporated herein by reference.

BACKGROUND

Fluoropolymers are attractive material for a variety of applications because they are relatively inert against a wide variety of chemical substances, have high melting points, and are generally biocompatible. Fluoropolymers, often in the form of finely divided powders that may be dispersed in liquid or solid carriers, can be used as a lubricant. However, known fluoropolymers used as lubricants generally have been found to exhibit very poor wear rate, which often mitigates the benefit of their low friction characteristics and other desirable physical and chemical properties. Thus, there is a need to address this and other deficiencies of the prior art.

SUMMARY

Embodiments of the present disclosure provide for mixtures, methods of making mixtures, articles, methods of making articles, and methods of using an article.

An embodiment of the present disclosure includes an article, among others, that includes: a mixture derived from a lubricant and a filler, where the filler is selected from the group consisting of: mullite, pyrophyllite, kyanite, dolomite, and a combination thereof. In an embodiment, the lubricant can be a fluoropolymer such as polytetrafluoroethylene.

An embodiment of the present disclosure includes a method for making an article, among others, that includes: mixing a lubricant with a filler to form a mixture, wherein the filler is selected from the group consisting of: mullite, pyrophyllite, kyanite, dolomite, and a combination thereof; and forming a compression mold of the mixture.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

Figure 1:
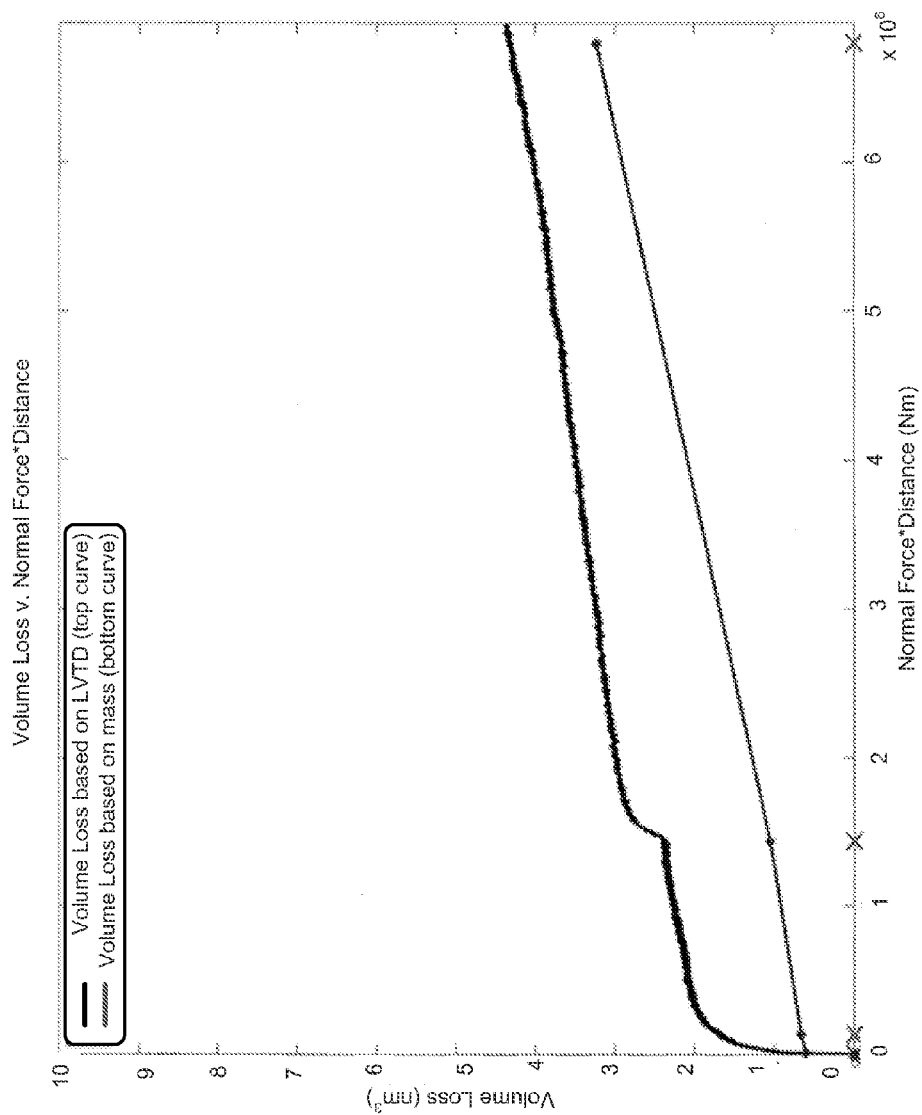
FIG. 1 illustrates a graph illustrating the Volume Loss v. Normal Force*Distance for this sample where mullite is the filler.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, fiber, fabrics, textiles, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for mixtures, methods for making mixtures, articles, methods for making articles, and methods of using articles. Embodiments of the present disclosure relate to articles having superior tribological properties. In particular, embodiments of the present disclosure have a low coefficient of friction (e.g., about 0.2 to 0.4) and very low wear rate (e.g., about $1 \times 10^{-7}$ mm$^3$/Nm to $1 \times 10^{-8}$ mm$^3$/Nm, or less). In addition, embodiments of the present disclosure provide for articles that are resistant to chemicals, have a high strength, are biocompatible, are water resistant, and/or have high thermal resistance (e.g., withstand extreme temperatures).

In an exemplary embodiment, the mixture includes a lubricant and one or more filler components (e.g., a filler and other materials that may be present in the filler component). In an embodiment, the lubricant can be about 5 to 95 weight % or about 75 to 95 weight % of the mixture. In an embodiment, the filler component can be about 5 to 95 weight % or about 5 to 25 weight % of the mixture. In an embodiment, the filler component can be about 5 to 25 weight % of the mixture and the lubricant is about 75 to 95 weight % of the mixture.

Embodiments of the filler can be a filler particle such as: mullite (two stoichiometric forms 3Al$_2$O$_3$2SiO$_2$ or 2Al$_2$O$_3$SiO$_2$), pyrophyllite (Al$_2$Si$_4$O$_{10}$(OH)$_2$), kyanite (Al$_2$O$_3$.SiO$_2$), dolomite (CaMg(CO$_3$)$_2$), or a combination thereof. In an embodiment, the filler particle can have one or more dimensions (e.g., diameter, length, width, height) on the nanometer scale (e.g., about 1 to 500 nm) to the micrometer scale (e.g., about 500 nm to 500 micrometers. In an embodiment, the filler particles can have a mixture of sizes, where, for example, some of the particles are about 1 to 500 nm along the longest dimension and other particles are about 1 micrometer to about 500 micrometers along the longest dimension.

In an embodiment, the filler component can include other materials such as minerals, clays, silicates, sepiolite, kaolinite, halloysite, clinochlore, vermiculite, chamosite, astrophyllite, glauconite, muscovite, talc, bauxite, quartz, mica, cristobalite, tremolite, and a combination thereof. In an embodiment, the other material(s) present can be or sum up to, if more than one is present, about 0.01 to 60 weight % of the filler component. In an embodiment, the other material can be removed so that the filler(s) is at a higher percentage of the mixture or article. In an embodiment, the other material can have a dimension (e.g., diameter) on the nanometer scale to the micrometer scale, or include a mixture of sizes of particles.

In an embodiment, the filler can be pyrophyllite, which can be purchased from R. T. Vanderbilt Company, Inc. (i.e., composition: <40 wt % pyrophyllite with impurities of quartz (50-60 wt %), mica (18-25 wt %) and kaolin clay (5-10 wt %), where quartz, mica and kaolin clay can be the other materials).

In an embodiment of an article, where the filler component is pyrophyllite and the lubricant is PTFE, the article can have a coefficient of friction of about 0.22 to 0.26 and can have a wear rate of about $5 \times 10^{-7}$ mm$^3$/Nm or less. The filler component can be about 5 wt % of the mixture and the lubricant can be about 95 wt % of the mixture. Additional details are provided in the Examples.

In an embodiment, the filler can be mullite, which can be purchased from Kyanite Mining Corporation (i.e., composition: 75-85 wt % mullite with impurities of amorphous silica (glass) (5-10 wt %) quartz (1-5 wt %), kyanite (1-5 wt %) and cristobalite (1-5 wt %), wherein quartz, kyanite, and cristobalite can be the other materials).

In an embodiment of an article, where the filler is mullite and the lubricant is PTFE, the article can have a coefficient of friction of about 0.25 to 0.29 and can have a wear rate of about $4 \times 10^{-7}$ mm$^3$/Nm or less. The filler component can be about 5 wt % of the mixture and the lubricant can be about 95 wt % of the mixture. Additional details are provided in the Examples.

In an embodiment, the filler can be dolomite, which can be purchased from Specialty Minerals Inc. (i.e., composition: 60-100 wt % dolomite with <1% quartz and <1 wt % tremolite, wherein quartz and tremolite can be the other materials).

In an embodiment of an article, where the filler is dolomite and the lubricant is PTFE, the article can have a coefficient of friction of about 0.29 to 0.33 and can have a wear rate of about $9.3 \times 10^{-8}$ mm$^3$/Nm or less. The filler component can be about 10 wt % of the mixture and the lubricant can be about 90 wt % of the mixture. Additional details are provided in the Examples.

In an embodiment, the filler can be kyanite, which can be purchased from Kyanite Mining Corporation (i.e., composition: 85-95 wt % kyanite with impurities of quartz (5-10 wt %), titanium dioxide (1-5 wt %), and cristobalite (<0.1%), where quartz, titanium dioxide, and cristobalite, can be the other materials).

In an embodiment of an article, where the filler is kyanite and the lubricant is PTFE, the article can have a coefficient of friction of about 0.3 to 0.34 and can have a wear rate of about $4 \times 10^{-7}$ mm$^3$/Nm or less. The filler component can be about 5 wt % of the mixture and the lubricant can be about 95 wt % of the mixture. Additional details are provided in the Examples.

As mentioned above, the mixture includes a lubricant such as a fluoropolymer. Embodiments of various types of fluoropolymer are described herein.

In an embodiment, an individual fluoropolymer can be used alone; mixtures or blends of two or more different kinds of fluoropolymers can be used as well. Fluoropolymers useful in the practice of this disclosure are prepared from at least one unsaturated fluorinated monomer (fluoromonomer). A fluoromonomer suitable for use herein preferably contains about 35 wt % or more fluorine, and preferably about 50 wt % or more fluorine, and can be an olefinic monomer with at least one fluorine or fluoroalkyl group or fluoroalkoxy group attached to a doubly-bonded carbon. In one embodiment, a fluoromonomer suitable for use herein is tetrafluoroethylene (TFE).

In one embodiment, the fluoropolymer can be polytetrafluoroethylene (PTFE), which refers to (a) polymerized tetrafluoroethylene by itself without any significant comonomer present, i.e. a homopolymer of TFE, and (b) modified PTFE, which is a copolymer of TFE with such small concentrations of comonomer that the melting point of the resultant polymer is not substantially reduced below that of PTFE (reduced, for example, by about 8% or less, about 4% or less, about 2% or less, or about 1% or less). Modified PTFE contains a small amount of comonomer modifier that improves film forming capability during baking (fusing).

Comonomers useful for such purpose typically are those that introduce bulky side groups into the molecule, and specific examples of such monomers are described below. The concentration of such comonomer is preferably less than 1 wt %, and more preferably less than 0.5 wt %, based on the total weight of the TFE and comonomer present in the PTFE. A minimum amount of at least about 0.05 wt % comonomer is preferably used to have a significant beneficial effect on processability. The presence of the comonomer is believed to cause a lowering of the average molecular weight.

PTFE (e.g., and modified PTFE) typically have a melt creep viscosity of at least about $1 \times 10^6$ Pa·s and preferably at least about $1 \times 10^8$ Pa·s. With such high melt viscosity, the polymer does not flow in the molten state and therefore is not a melt-processible polymer. The measurement of melt creep viscosity is disclosed in col. 4 of U.S. Pat. No. 7,763,680, which is incorporated herein by reference. The high melt viscosity of PTFE arises from its extremely high molecular weight (Mn), e.g. at least about $10^6$. Additional indicia of this high molecular weight include the high melting temperature of PTFE, which is at least 330° C., usually at least 331° C. and most often at least 332° C. (all measured on first heat). The non-melt flowability of the PTFE, arising from its extremely high melt viscosity, manifests itself as a melt flow rate (MFR) of 0 when measured in accordance with ASTM D 1238-10 at 372° C. and using a 5 kg weight. This high melt viscosity also leads to a much lower heat of fusion obtained for the second heat (e.g. up to 55 J/g) as compared to the first heat (e.g. at least 75 J/g) to melt the PTFE, representing a difference of at least 20 J/g. The high melt viscosity of the PTFE reduces the ability of the molten PTFE to recrystallize upon cooling from the first heating. The high melt viscosity of PTFE enables its standard specific gravity (SSG) to be measured, which measurement procedure (ASTM D 4894-07, also described in U.S. Pat. No. 4,036,802, which is incorporated herein by reference) includes sintering the SSG sample free standing (without containment) above its melting temperature without change in dimension of the SSG sample. The SSG sample does not flow during the sintering.

Low molecular weight PTFE is commonly known as PTFE micropowder, which distinguishes it from the PTFE described above. The molecular weight of PTFE micropowder is low relative to PTFE, i.e. the molecular weight (Mn) is generally in the range of $10^4$ to $10^5$. The result of this lower molecular weight of PTFE micropowder is that it has fluidity in the molten state, in contrast to PTFE which is not melt flowable. The melt flowability of PTFE micropowder can be characterized by a melt flow rate (MFR) of at least about 0.01 g/10 min, preferably at least about 0.1 g/10 min, more preferably at least about 5 g/10 min, and still more preferably at least about 10 g/10 min., as measured in accordance with ASTM D 1238-10, at 372° C. using a 5 kg weight on the molten polymer.

While PTFE micropowder is characterized by melt flowability because of its low molecular weight, the PTFE micropowder by itself is not melt fabricable, i.e. an article molded from the melt of PTFE micropowder has extreme brittleness, and an extruded filament of PTFE micropowder, for example, is so brittle that it breaks upon flexing. Because of its low molecular weight (relative to non-melt-flowable PTFE), PTFE micropowder has no strength, and compression molded plaques for tensile or flex testing generally cannot be made from PTFE micropowder because the plaques crack or crumble when removed from the compression mold, which prevents testing for either the tensile property or the MIT Flex Life. Accordingly, the micropowder is assigned zero tensile strength and an MIT Flex Life of zero cycles. In contrast, PTFE is flexible, rather than brittle, as indicated for example by an MIT flex life [ASTM D-2176-97a (2007)], using an 8 mil (0.21 mm) thick compression molded film] of at least 1000 cycles, preferably at least 2000 cycles. As a result, PTFE micropowder finds use as a blend component with other polymers such as PTFE itself and/or copolymers of TFE with other monomers such as those described below.

In other embodiments, a fluoromonomer suitable for use herein, by itself to prepare a homopolymer or in copolymerization with other comonomers such as TFE, can be represented by the structure of the following Formula I:

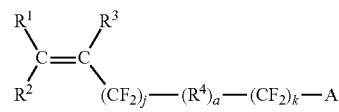

where $R^1$ and $R^2$ are each independently selected from H, F and Cl; $R^3$ is H, F, or a $C_1 \sim C_{12}$, or $C_1 \sim C_8$, or $C_1 \sim C_6$, or $C_1 \sim C_4$ straight-chain or branched, or a $C_3 \sim C_{12}$, or $C_3 \sim C_8$, or $C_3 \sim C_6$ cyclic, substituted or unsubstituted, alkyl radical; $R^4$ is a $C_1 \sim C_{12}$, or $C_1 \sim C_8$, or $C_1 \sim C_6$, or $C_1 \sim C_4$ straight-chain or branched, or a $C_3 \sim C_{12}$, or $C_3 \sim C_8$, or $C_3 \sim C_6$ cyclic, substituted or unsubstituted, alkylene radical; A is H, F or a functional group; a is 0 or 1; and j and k are each independently 0 to 10; provided that, when a, j and k are all 0, at least one of $R^1$, $R^2$, $R^3$ and A is not F.

An unsubstituted alkyl or alkylene radical as described above contains no atoms other than carbon and hydrogen. In a substituted hydrocarbyl radical, one or more halogens selected from Cl and F can be optionally substituted for one or more hydrogens; and/or one or more heteroatoms selected from 0, N, S and P can optionally be substituted for any one or more of the in-chain (i.e. non-terminal) or in-ring carbon atoms, provided that each heteroatom is separated from the next closest heteroatom by at least one and preferably two carbon atoms, and that no carbon atom is bonded to more than one heteroatom. In other embodiments, at least 20%, or at least 40%, or at least 60%, or at least 80% of the replaceable hydrogen atoms are replaced by fluorine atoms. Preferably a Formula I fluoromonomer is perfluorinated, i.e. all replaceable hydrogen atoms are replaced by fluorine atoms.

In a Formula I compound, a linear $R^3$ radical can, for example, be a $C_b$ radical where b is 1, 2, 3, 4, 5, 6, 7, 8, 9, 10, 11 or 12 and the radical can contain from 1 up to 2b+1 fluorine atoms. For example, a $C_4$ radical can contain from 1 to 9 fluorine atoms. A linear $R^3$ radical is perfluorinated with 2b+1 fluorine atoms, but a branched or cyclic radical will be perfluorinated with fewer than 2b+1 fluorine atoms. In a Formula I compound, a linear $R^4$ radical can, for example, be a $C_c$ radical where c is 1, 2, 3, 4, 5, 6, 7, 8, 9, 10, 11 or 12 and the radical can contain from 1 to 2c fluorine atoms. For example, a $C_6$ radical can contain from 1 to 12 fluorine atoms. A linear $R^4$ radical is perfluorinated with 2c fluorine atoms, but a branched or cyclic radical will be perfluorinated with fewer than 2c fluorine atoms.

Examples of a $C_1 \sim C_{12}$ straight-chain or branched, substituted or unsubstituted, alkyl or alkylene radical suitable for use herein can include or be derived from a methyl, ethyl, n-propyl, i-propyl, n-butyl, sec-butyl, tert-butyl, n-pentyl, n-hexyl, n-octyl, trimethylpentyl, allyl and propargyl radical. Examples of a $C_3$~$C_{12}$ cyclic aliphatic, substituted or unsubstituted, alkyl or alkylene radical suitable for use herein can include or be derived from an alicyclic functional group containing in its structure, as a skeleton, cyclohexane, cyclooctane, norbornane, norbornene, perhydro-anthracene, adamantane, or tricyclo-[5.2.1.0$^{2.6}$]-decane groups.

Functional groups suitable for use herein as the A substituent in Formula I include ester, alcohol, acid (including carbon-, sulfur-, and phosphorus-based acid) groups, and the salts and halides of such groups; and cyanate, carbamate, and nitrile groups. Specific functional groups that can be used include —SO$_2$F, —CN, —COOH, and —CH$_2$—Z wherein —Z is —OH, —OCN, —O—(CO)—NH$_2$, or —OP(O)(OH)$_2$.

Formula I fluoromonomers that can be homopolymerized include vinyl fluoride (VF), to prepare polyvinyl fluoride (PVF), and vinylidene fluoride (VF$_2$) to prepare polyvinylidene fluoride (PVDF), and chlorotrifluoroethylene to prepare polychlorotrifluoroethylene. Examples of Formula I fluoromonomers suitable for copolymerization include those in a group such as ethylene, propylene, 1-butene, 1-hexene, 1-octene, chlorotrifluoroethylene (CTFE), trifluoroethylene, hexafluoroisobutylene, vinyl fluoride (VF), vinylidene fluoride (VF$_2$), and perfluoroolefins such as hexafluoropropylene (HFP), and perfluoroalkyl ethylenes such as perfluoro (butyl) ethylene (PFBE). A preferred monomer for copolymerization with any of the above named comonomers is tetrafluoroethylene (TFE).

In yet other embodiments, a fluoromonomer suitable for use herein, by itself to prepare a homopolymer or in copolymerization with TFE and/or any of the other comonomers described above, can be represented by the structure of the following Formula II:

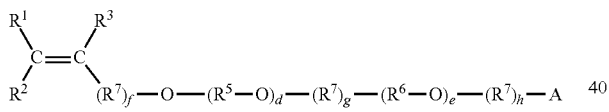

II wherein R$^1$ through R$^3$ and A are each as set forth above with respect to Formula I; d and e are each independently 0 to 10; f, g and h are each independently 0 or 1; and R$^5$ through R$^7$ can each be selected from the same radicals as described above with respect to R$^4$ in Formula I except that when d and e are both non-zero and g is zero, R$^5$ and R$^6$ are different R$^4$ radicals.

Formula II compounds introduce ether functionality into fluoropolymers suitable for use herein, and include fluorovinyl ethers such as those represented by the following formula: CF$_2$═CF—(O—CF$_2$CFR$^{11}$)$_h$—O—CF$_2$CFR$^{12}$SO$_2$F, where R$^{11}$ and R$^{12}$ are each independently selected from F, Cl, or a perfluorinated alkyl group having 1 to 10 carbon atoms, and h=0, 1 or 2. Examples of polymers of this type that are disclosed in U.S. Pat. No. 3,282,875 include CF$_2$═CF—O—CF$_2$CF(CF$_3$)—O—CF$_2$CF$_2$SO$_2$F and perfluoro(3,6-dioxa-4-methyl-7-octenesulfonyl fluoride), and examples that are disclosed in U.S. Pat. Nos. 4,358,545 and 4,940,525 include CF$_2$═CF—O—CF$_2$CF$_2$SO$_2$F. Another example of a Formula II compound is CF$_2$═CF—O—CF$_2$—CF(CF$_3$)—O—CF$_2$CF$_2$CO$_2$CH$_3$, the methyl ester of perfluoro(4,7-dioxa-5-methyl-8-nonenecarboxylic acid), as disclosed in U.S. Pat. No. 4,552,631. Similar fluorovinyl ethers with functionality of nitrile, cyanate, carbamate, and phosphonic acid are disclosed in U.S. Pat. Nos. 5,637,748, 6,300,445 and 6,177,196. Methods for making fluoroethers suitable for use herein are set forth in the U.S. patents listed above in this paragraph, and each of the U.S. patents listed above in this paragraph is by this reference incorporated in its entirety as a part hereof for all purposes.

Particular Formula II compounds suitable for use herein as a comonomer include fluorovinyl ethers such as perfluoro (allyl vinyl ether) and perfluoro(butenyl vinyl ether). Preferred fluorovinyl ethers include perfluoro(alkyl vinyl ethers) (PAVE), where the alkyl group contains 1 to 5 carbon atoms, with perfluoro(ethyl vinyl ether) (PEVE) and perfluoro(propyl vinyl ether) (PPVE), and perfluoro(methyl vinyl ether) (PMVE) being preferred.

In yet other embodiments, a fluoromonomer suitable for use herein, by itself to prepare a homopolymer or in copolymerization with TFE and/or any of the other comonomers described above, can be represented by the structure of the following Formula III:

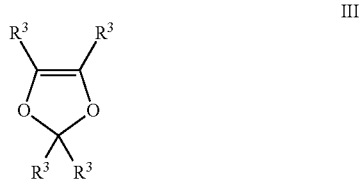

III where each R$^3$ is independently as described above in relation to Formula I. Suitable Formula III monomers include perfluoro-2,2-dimethyl-1,3-dioxole (PDD).

In yet other embodiments, a fluoromonomer suitable for use herein, by itself to prepare a homopolymer or in copolymerization with TFE and/or any of the other comonomers described above, can be represented by the structure of the following Formula IV:

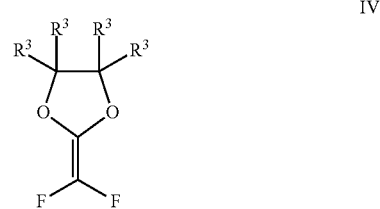

IV where each R$^3$ is independently as described above in relation to Formula I. Suitable Formula IV monomers include perfluoro-2-methylene-4-methyl-1,3-dioxolane (PMD).

In various embodiments, fluoropolymer copolymers suitable for use herein can be prepared from any two, three, four or five of these monomers: TFE and a Formula I, II, III and IV monomer. The following are thus representative combinations that are available: TFE/Formula I; TFE/Formula II; TFE/Formula III; TFE/Formula IV; TFE/Formula I/Formula II; TFE/Formula I/Formula III; TFE/Formula I/Formula IV; Formula I/Formula II; Formula I/Formula III; and Formula I/Formula IV. Provided that at least two of the five kinds of monomers are used, a unit derived from each monomer can be present in the final copolymer in an amount of about 1 wt % or more, or about 5 wt % or more, or about 10 wt % or more, or about 15 wt % or more, or about 20 wt % or more, and yet no more than about 99 wt %, or about 95 wt % or less, or about 90 wt % or less, or about 85 wt % or less, or about 80 wt % or less (based on the weight of the final copolymer); with the balance being made up of one, two, three or all of the other five kinds of monomers.

A fluoropolymer as used herein can also be a mixture of two or more of the homo- and/or copolymers described above, which is usually achieved by dry blending. A fluoropolymer as used herein can also, however, be a polymer alloy prepared from two or more of the homo- and/or copolymers described above, which can be achieved by melt kneading the polymer together such that there is mutual dissolution of the polymer, chemical bonding between the polymers, or dispersion of domains of one of the polymers in a matrix of the other.

Tetrafluoroethylene polymers suitable for use herein can be produced by aqueous polymerization (as described in U.S. Pat. No. 3,635,926) or polymerization in a perhalogenated solvent (U.S. Pat. No. 3,642,742) or hybrid processes involving both aqueous and perhalogenated phases (U.S. Pat. No. 4,499,249). Free radical polymerization initiators and chain transfer agents are used in these polymerizations and have been widely discussed in the literature. For example, persulfate initiators and alkane chain transfer agents are described for aqueous polymerization of TFE/PAVE copolymers. Fluorinated peroxide initiators and alcohols, halogenated alkanes, and fluorinated alcohols are described for nonaqueous or aqueous/nonaqueous hybrid polymerizations.

Various fluoropolymers suitable for use herein include those that are thermoplastic, which are fluoropolymers that, at room temperature, are below their glass transition temperature (if amorphous), or below their melting point (if semi-crystalline), and that become soft when heated and become rigid again when cooled without the occurrence of any appreciable chemical change. A semi-crystalline thermoplastic fluoropolymer can have a heat of fusion of about 1 J/g or more, or about 4 J/g or more, or about 8 J/g or more, when measured by Differential Scanning Calorimetry (DSC) at a heating rate of 10° C./min (according to ASTM D 3418-08). Various fluoropolymers suitable for use herein can additionally or alternatively be characterized as melt-processible, and melt-processible fluoropolymers can also be melt-fabricable. A melt-processible fluoropolymer can be processed in the molten state, i.e. fabricated from the melt using conventional processing equipment such as extruders and injection molding machines, into shaped articles such as films, fibers and tubes. A melt-fabricable fluoropolymer can be used to produce fabricated articles that exhibit sufficient strength and toughness to be useful for their intended purpose despite having been processed in the molten state. This useful strength is often indicated by a lack of brittleness in the fabricated article, and/or an MIT Flex Life of at least about 1000 cycles, or at least about 2000 cycles (measured as described above), for the fluoropolymer itself.

Examples of thermoplastic, melt-processible and/or melt-fabricable fluoropolymers include copolymers of tetrafluoroethylene (TFE) and at least one fluorinated copolymerizable monomer (comonomer) present in the polymer in sufficient amount to reduce the melting point of the copolymer below that of PTFE, e.g. to a melting temperature no greater than 315° C. Such a TFE copolymer typically incorporates an amount of comonomer into the copolymer in order to provide a copolymer which has a melt flow rate (MFR) of at least about 1, or at least about 5, or at least about 10, or at least about 20, or at least about 30, and yet no more than about 100, or no more than about 90, or no more than about 80, or no more than about 70, or no more than about 60, as measured according to ASTM D-1238-10 using a weight on the molten polymer and melt temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s. Melt viscosity in Pa·s is 531,700/MFR in g/10 min.

In general, thermoplastic, melt-processible and/or melt-fabricable fluoropolymers as used herein include copolymers that contain at least about 40 mol %, or at least about 45 mol %, or at least about 50 mol %, or at least about 55 mol %, or at least about 60 mol %, and yet no more than about 99 mol %, or no more than about 90 mol %, or no more than about 85 mol %, or no more than about 80 mol %, or no more than about 75 mol % TFE; and at least about 1 mol %, or at least about 5 mol %, or at least about 10 mol %, or at least about 15 mol %, or at least about 20 mol %, and yet no more than about 60 mol %, or no more than about 55 mol %, or no more than about 50 mol %, or no more than about 45 mol %, or no more than about 40 mol % of at least one other monomer. Suitable comonomers to polymerize with TFE to form melt-processible fluoropolymers include a Formula I, II, III and/or IV compound; and, in particular, a perfluoroolefin having 3 to 8 carbon atoms [such as hexafluoropropylene (HFP)], and/or perfluoro(alkyl vinyl ethers) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFPNF$_2$). Additional melt-processible fluoropolymers are the copolymers of ethylene (E) or propylene (P) with TFE or chlorinated TFE (CTFE), notably ETFE, ECTFE and PCTFE. Also useful in the same manner are film-forming polymers of polyvinylidene fluoride (PVDF) and copolymers of vinylidene fluoride as well as polyvinyl fluoride (PVF) and copolymers of vinyl fluoride.

Fluoropolymers that are thermoplastic, melt-processible and/or melt-fabricable are in general characterized by a melt flow rate as described above, and can be distinguished from fluoroelastomers, which typically have a glass transition temperature below about 25° C., exhibit little or no crystallinity at room temperature, and/or have a combination of low flex modulus, high elongation, and rapid recovery from deformation. Fluoroelastomers can also be characterized, in various applications, by the definition in ASTM Special Technical Bulletin No. 184 under which they can be stretched (at room temperature) to twice their intrinsic length, and, once released after being held under tension for 5 minutes, return to within 10% of their initial length in the same time.

Fluoropolymers suitable for use herein thus also include fluoroelastomers (fluorocarbon elastomers), which typically contain at least about 25 wt %, or at least about 35 wt %, or at least about 45 wt %, and yet no more than about 70 wt %, or no more than about 60 wt %, or no more than about 50 wt % (based on the total weight of the fluoroelastomer), of a first copolymerized fluorinated monomer such as vinylidene fluoride (VF$_2$) or TFE; with the remaining copolymerized units in the fluoroelastomer being selected from other, different fluoro-monomers such as a Formula I, II, III and/or IV compound; and, in particular, hydrocarbon olefins. Fluoroelastomers may also, optionally, comprise units of one or more cure site monomers. When present, copolymerized cure site monomers are typically at a level of 0.05 to 7 wt %, based on total weight of fluorocarbon elastomer. Examples of suitable cure site monomers include: (i) bromine-, iodine-, or chlorine-containing fluorinated olefins or fluorinated vinyl ethers; (ii) nitrile group-containing fluorinated olefins or fluorinated vinyl ethers; (iii) perfluoro(2-phenoxypropyl vinyl ether); and (iv) non-conjugated dienes.

Preferred TFE-based fluoroelastomer copolymers include TFE/PMVE, TFE/PMVE/E, TFE/P and TFE/PNF$_2$. Preferred VF$_2$ based fluorocarbon elastomer copolymers include VF$_2$/HFP, VF$_2$/HFP/TFE, and VF$_2$/PMVE/TFE. Any of these elastomer copolymers may further comprise units of cure site monomer.

Embodiments of the article (e.g., including the lubricant and a filler) can be made using any suitable processing technique that results in a composite body comprising the fluoropolymer matrix and alumina and silica particles dispersed therein.

For example, embodiments based on fluoropolymers that are not melt processable can be made by a sintering or molding technique, in which the components are first mixed (e.g., by mechanical mixing, dispersion in a liquid, or other forms of mixing). The mixture is then transferred to a molding chamber where it is consolidated with pressure. In an implementation, the molding is done at a pressure of about 20 to 200 MPa for about 10 seconds to 10 minutes and thereafter the fluoropolymer is heated to above its melting point, held for a period of time (e.g., about 10 minutes to 10 hrs) to permit the fluoropolymer to sinter, and then cooled to ambient temperature. The sintering operation can be carried out under continued application of compression (denominated herein as "compression molding") or as a free sintering, i.e., without continued application of a compressive force. One possible implementation of a free sintering manufacture is set forth in ASTM Standard No. 1238-10. In other implementations, the consolidation is carried out at a pressure of about 20 to 250 MPa for a time of about 10 sec to 10 min. The sintering may be accomplished by ramping the temperature at a rate of about 2° C. per minute to a preselected temperature of about 360° C. to 390° C. and held for a period of about 1 to 10 hrs) and then cooled (e.g., at about 2° C. per minute) down to room temperature. Optionally, the compressive pressure is maintained during the sintering.

Other methods of making the article are also contemplated within the scope of the present disclosure. For example, alternative embodiments provide fluoropolymer composite bodies formed by melt processing the composite powder material. In some implementations, the melt processing comprises a multistage process, in which an intermediate is first produced in the form of powder, granules, pellets, or the like, and thereafter remelted and formed into an article of manufacture having a desired final shape. In an implementation, the intermediate is formed by a melt compounding or blending operation that comprises transformation of a thermoplastic resin from a solid pellet, granule or powder into a molten state by the application of thermal or mechanical energy. Requisite additive materials, such as composite powder material bearing fluoropolymers and particle additives (e.g., silica and alumina) prepared as described herein, may be introduced during the compounding or mixing process, before, during, or after the polymer matrix has been melted or softened. The compounding equipment then provides sufficient mechanical energy to provide sufficient stress to disperse the ingredients in the compositions, move the polymer, and distribute the additives to form a homogeneous mixture.

Melt blending can be accomplished with batch mixers (e.g., mixers available from Haake, Brabender, Banbury, DSM Research, and other manufacturers) or with continuous compounding systems, which may employ extruders or planetary gear mixers. Suitable continuous process equipment includes co-rotating twin screw extruders, counter-rotating twin screw extruders, multi-screw extruders, single screw extruders, co-kneaders (reciprocating single screw extruders), and other equipment designed to process viscous materials. Batch and continuous processing hardware suitable for carrying out steps of the present method may impart sufficient thermal and mechanical energy to melt specific components in a blend and generate sufficient shear and/or elongational flows and stresses to break solid particles or liquid droplets and then distribute them uniformly in the major (matrix) polymer melt phase. Ideally, such systems are capable of processing viscous materials at high temperatures and pumping them efficiently to downstream forming and shaping equipment. It is desirable that the equipment also be capable of handling high pressures, abrasive wear and corrosive environments. Compounding systems used in the present method typically pump a formulation melt through a die and pelletizing system.

The intermediate may be formed into an article of manufacture having a desired shape using techniques such as injection molding, blow molding, extruded film casting, blown film, fiber spinning, stock shape extrusion, pipe and tubing extrusion, thermoforming, compression molding, or the like, accomplished using suitable forming equipment.

Such embodiments may require that the fluoropolymer powder particles used to form the slurry and composite powder material be composed of a melt-processible fluoropolymer.

In other implementations, material produced by the melt-blending or compounding step is immediately melt processed into a desired shape, without first being cooled or formed into powder, granules, or the like. For example, in-line compounding and injection molding systems combine twin-screw extrusion technology in an injection molding machine so that the matrix polymer and other ingredients experience only one melt history.

In other embodiments, materials produced by shaping operations, including melt processing and forming, compression molding or sintering, may be machined into final shapes or dimensions. In still other implementations, the surfaces of the parts may be finished by polishing or other operations. In still other embodiments, the composite powder material is used as a carrier material by which the particles (e.g., filler) are introduced into a matrix that may include an additional amount of the same fluoropolymer used in the composite powder material, one or more other fluoropolymers, or both. For example, the composite powder material may be formed using the present slurry technique with a first fluoropolymer powder material that is not melt-processible, with the intermediate thereafter blended with a second, melt-processible fluoropolymer powder. In an embodiment, the proportions of the two polymers are such that the overall blend is melt-processible. Other embodiments may entail more than two blended fluoropolymers.

Alternatively, the intermediate is formed with a non-melt processible fluoropolymer and thereafter combined with more of the same fluoropolymer and processed by compression molding and sintering.

Tribological Testing

The wear resistance and coefficient of friction data shown herein are obtained using samples produced in accordance with the following procedure.

The samples are formed in a mold that produces samples in the form of a right circular cylinder, which may have a length of about 25 mm. Wear-measurement samples having the form of a pin and measuring about 6.4 mm×6.4 mm×12.7 mm are machined out of the interior of the compression molded cylinders using a laboratory numerically controlled milling machine. The finished samples are then measured and weighed; a density of each sample is calculated from these measurements. Only one sample is made from each compression-molded cylinder.

The wear resistance is tested against a counterface in the form of a plate made from 304 stainless steel and measuring about 38 mm×25.4 mm×3.4 mm. The counterface is lapped to produce a surface profile with about a 161 nm R rms (with a standard deviation of 35 nm). A linear reciprocating tribometer operated using LabVIEW™ software program control is used to test the composite material under dry sliding conditions according to embodiments of the present disclosure. The counterface is mounted to a table that reciprocates 25 mm in each direction and is positioned with a stepper motor and ball screw system.

Prior to testing, the counterfaces are washed in soap and water, sonicated for about 15 minutes in methanol, and then dried with a laboratory wipe. The composites are wiped down with methanol but are not washed or sonicated. The pin sample is mounted directly to a 6-channel load cell that couples to a linear actuator. The control system actuates two electro-pneumatic valves that pressurize the loading cylinder. Table position, pin displacement, friction force and normal force are recorded with the same software. The normal load applied to the nominally square 6.4 mm×6.4 mm surface of the pin is 250 N, which corresponds to a nominal pressure of 6.25 MPa, and the sliding velocity is 50 mm/s. The entire apparatus is located inside a soft-walled clean room with conditioned laboratory air of relative humidity between 25-50%.

The mass of the pin is measured with a Mettler Toledo AX205 precision analytical balance that has a range of 220 g and a resolution of 10 μg. The mass loss of the sample, the density of the material, the total test sliding distance and the time averaged normal load are used to calculate the wear rate with the following equation:

$$k\left[\frac{mm^3}{Nm}\right] = \frac{\text{mass loss}[mg] / \rho\left[\frac{mg}{mm^3}\right]}{F[N] * d[m]}$$

The tests are interrupted periodically so the sample can be weighed. A steady state wear rate is determined as the wear rate once the material runs in. "Running in" is a time towards the beginning of testing where a transfer film is being developed and a slightly higher mass loss rate is observed. It is observed that after the initial run-in, the wear rate is relatively constant.

Wear measurements are made using two methods: a mass loss method and a direct height loss measurement. For a mass loss measurement, a sample is massed both before and after sliding occurs. Based on the change in mass and the density of the material, a volume loss and wear rate is obtained. A displacement based measurement is complementary to the mass based measurement. A linear variable differential transformer (LVDT) monitors a height change of the sample, which can be equated to a volume and wear rate measurements. It should be noted that for these materials, the low wear rate requires at least 50,000 km of sliding for accurate wear measurements to be obtained. It should also be noted that more ideal counter materials and material finishes can generate lower wear rates.

Although not intending to be bound by theory, it appears that the combination of the fluoropolymer and filler produces a synergistic effect on reducing the steady state wear rate. Although not intending to be bound by theory, the superior tribological properties of the articles may be the result of reactions occurring between the components.

In an embodiment, articles made in accordance with the foregoing process can be used in low friction applications. The types of articles can vary greatly and include articles where reduced friction is advantageous. In general, an embodiment of the article can have one or more sliding surfaces or surfaces in contact with another structures surface. The articles can have a variety of shapes and cross sections. In an embodiment, the shape of the article can be a simple geometrical shape (e.g., spherical, polygonal, and the like) or a complex geometrical shape (e.g., irregular shapes). In general, the article can have a cross-sectional shape including, but not limited to, a polygon, a curved cross-section, irregular, and combinations thereof.

Embodiments of the articles can be used in many structures, parts, and components in the in the automotive, industrial, aerospace industries, and sporting equipment industries, to name but a few industries where articles having superior tribology characteristics are advantageous. The article can be used in many different applications including, but not limited to, mechanical parts (e.g., bearing, joins, pistons, etc.), structures having load bearing surfaces, sporting equipment, machine parts and equipment, and the like.

In an embodiment, the articles can be used in many structures, parts, and components in the in the automotive, industrial, aerospace industries, and sporting equipment industries, to name but a few industries where articles having superior tribology characteristics are advantageous. In an embodiment, the article can be used in many different applications including, but not limited to, mechanical parts (e.g., bearing, joins pistons, etc.), structures having load bearing surfaces, sporting equipment, machine parts and equipment, and the like. In particular, the article can include a bearing, bushing, socket, and other high cycle and high friction components.

It should also be noted that the tribological properties of articles of the present disclosure can be designed for a particular application. Thus, embodiments of the present disclosure can provide articles that can satisfy many different requirements for different industries and for particular components.

EXAMPLES

Now having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

This example focuses on mullite as the filler. In particular, the PTFE is about 95 weight % and the mullite filler is about 5 weight %. The counterface on which the sample was tested is 304L stainless steel lapped. The density of the sample is 2.2 mg/mm$^3$. The testing parameters are: reciprocating length, 25.4 mm, sliding speed, 50.8 mm/s, and average normal force, 257.2 N. The result are as follows: initial wear rate $4.8\times10^{-5}$ mm$^3$/Nm at 1000 cycles, best wear rate $3\times10^{-7}$ mm$^3$/Nm at 100,000 cycles, total wear rate $5.2\times10^{-7}$ mm$^3$/Nm at 539,762 cycles, uncertainty in total wear rate, $4.5\times10^{-9}$ mm$^3$/Nm, average friction coefficient, 0.27, and volume lost, 3.23 mm$^3$. FIG. 1 illustrates a graph illustrating the Volume Loss v. Normal Force*Distance for this sample. The supplier specified mullite composition was about 75-85% mullite with impurities of SiO$_2$, kyanite and cristobalite.

Example 2

Figure 2:
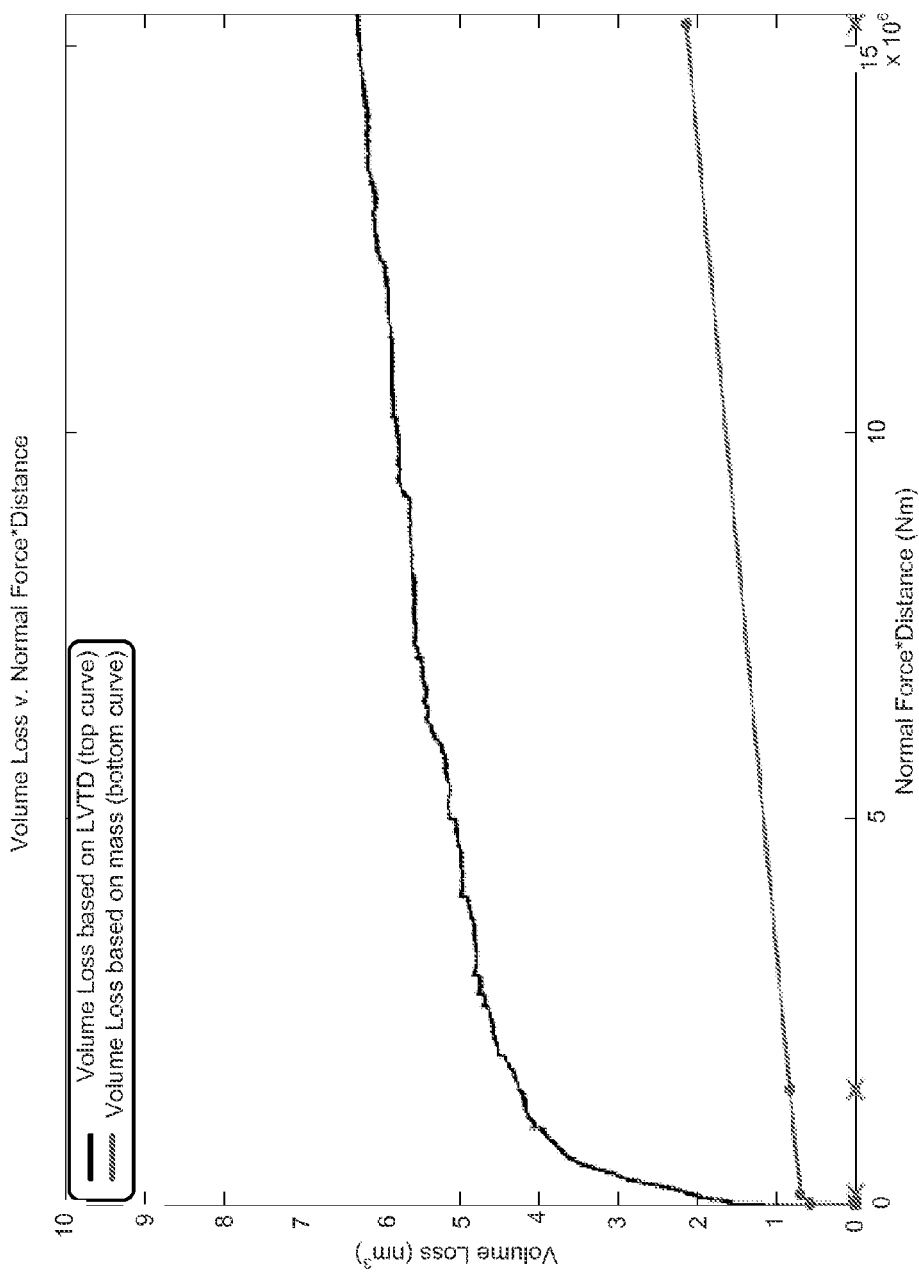
FIG. 2 illustrates a graph illustrating the Volume Loss v. Normal Force*Distance for this sample where dolomite is the filler.

This example focuses on dolomite as the filler. In particular, the PTFE is about 95 weight % and the dolomite filler is about 5 weight %. The counterface on which the sample was tested is 304 stainless steel lapped. The density of the sample is 2.2 mg/mm$^3$. The testing parameters are: reciprocating length, 25.4 mm, sliding speed, 50.8 mm/s, and average normal force, 274.1 N. The result are as follows: initial wear rate $4.1\times10^{-5}$ mm$^3$/Nm at 1000 cycles, best wear rate $9.3\times10^{-8}$ mm$^3$/Nm at 1,000,000 cycles, total wear rate $1.1\times10^{-7}$ mm$^3$/Nm at 1,100,000 cycles, uncertainty in total wear rate, $1.2\times10^{-9}$ mm$^3$/Nm, average friction coefficient, 0.31, and volume lost, 2.14 mm$^3$. FIG. 2 illustrates a graph illustrating the Volume Loss v. Normal Force*Distance for this sample. The supplier specified dolomite composition was >98% dolomite with <1% quartz and <1% tremolite Example 3

Figure 3:
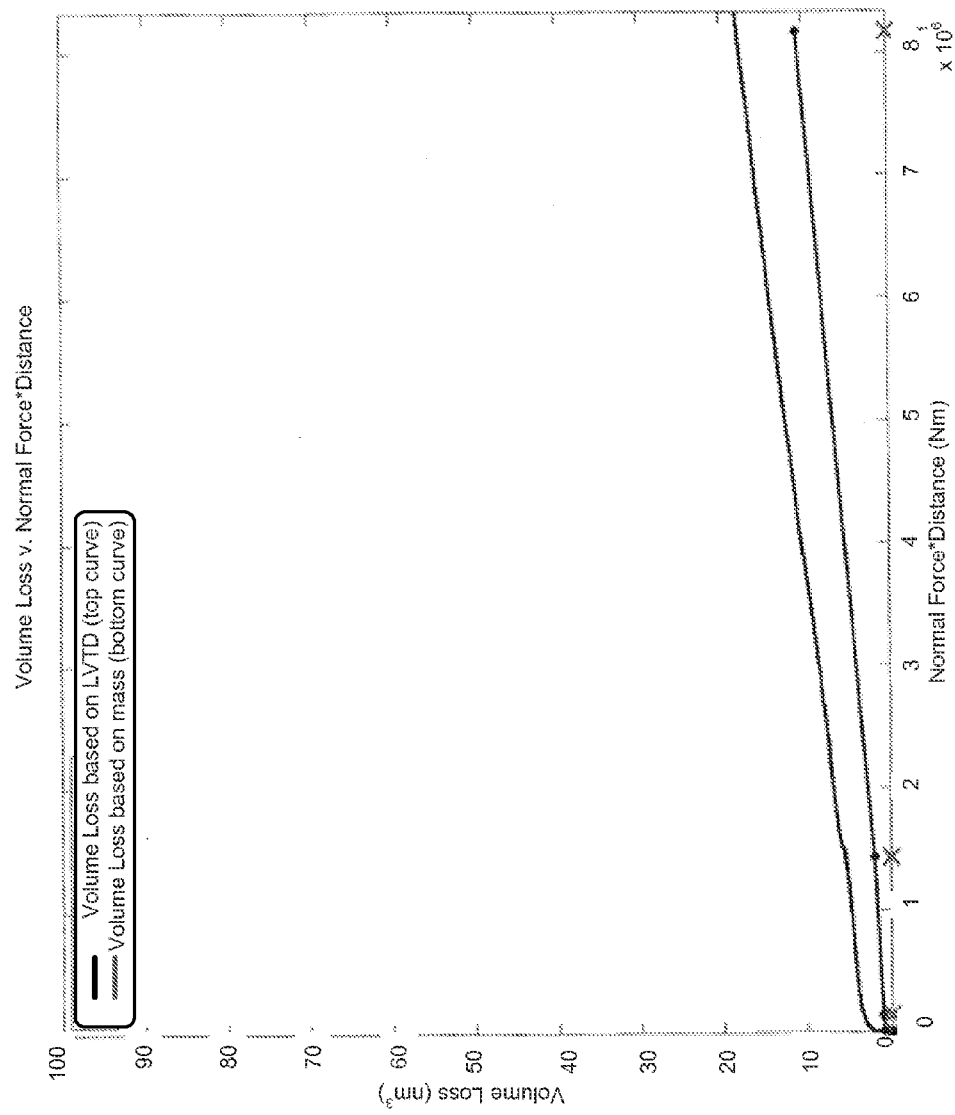
FIG. 3 illustrates a graph illustrating the Volume Loss v. Normal Force*Distance for this sample where kyanite is the filler.

This example focuses on kyanite as the filler. In particular, the PTFE is about 95 weight % and the kyanite filler is about 5 weight %. The counterface on which the sample was tested is 304 stainless steel lapped. The density of the sample is 2.2 mg/mm$^3$. The testing parameters are: reciprocating length, 25.4 mm, sliding speed, 50.8 mm/s, and average normal force, 257.3 N. The result are as follows: initial wear rate $7.8\times10^{-5}$ mm$^3$/Nm at 1000 cycles, best wear rate $3.5\times10^{-7}$ mm$^3$/Nm at 10,000 cycles, total wear rate $1.5\times10^{-6}$ mm$^3$/Nm at 637,709 cycles, uncertainty in total wear rate, $9.8\times10^{-9}$ mm$^3$/Nm, average friction coefficient, 0.32, and volume lost, 10.8 mm$^3$. FIG. 3 illustrates a graph illustrating the Volume Loss v. Normal Force*Distance for this sample. The supplier specified kyanite composition was about 85-95% kyanite with impurities of quartz, titania and cristobalite.

Example 4

Figure 4:
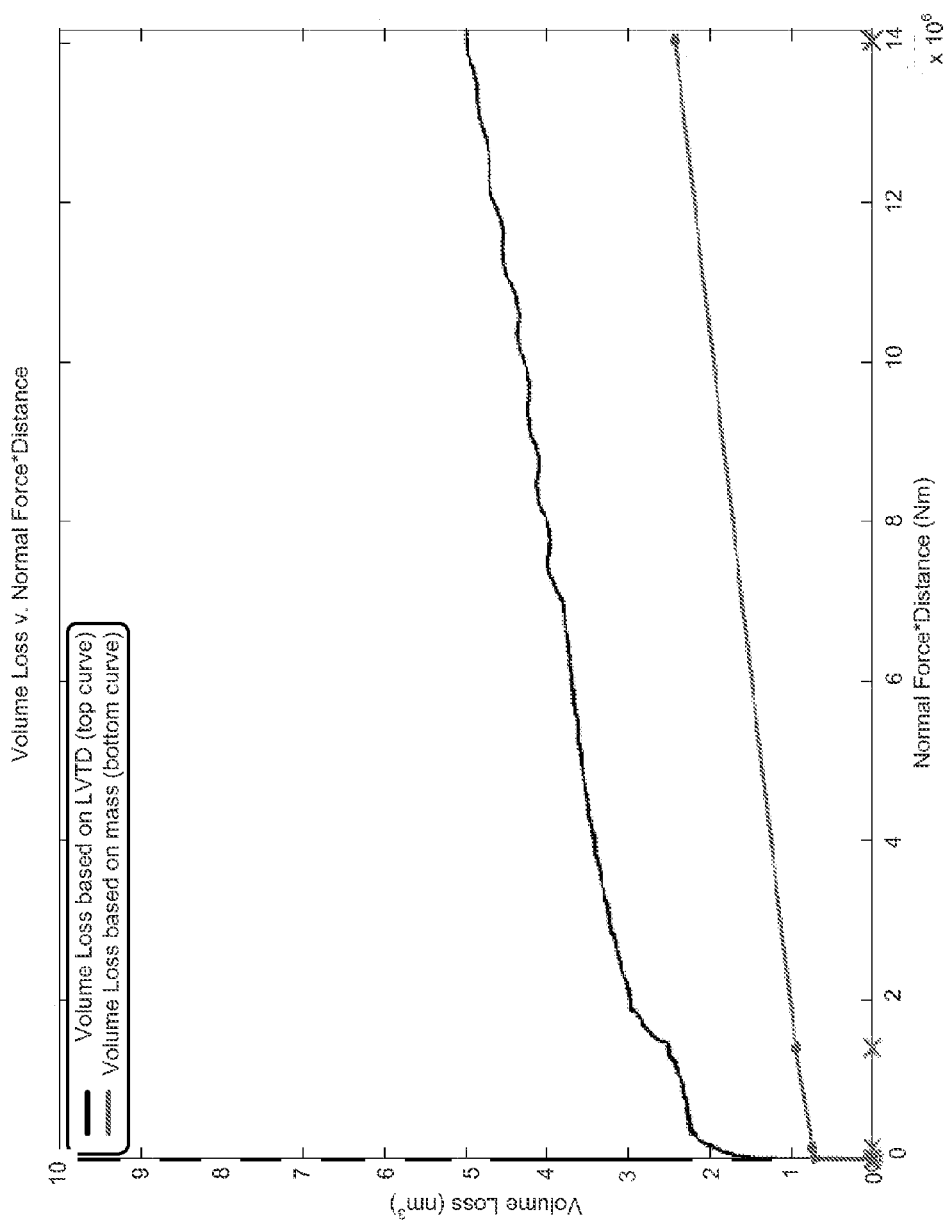
FIG. 4 illustrates a graph illustrating the Volume Loss v. Normal Force*Distance for this sample where pyrophyllite is the filler.

This example focuses on pyrophyllite as the filler. In particular, the PTFE is about 95 weight % and the pyrophyllite filler is about 5 weight %. The counterface on which the sample was tested is 304 stainless steel lapped. The density of the sample is 2.2 mg/mm$^3$. The testing parameters are: reciprocating length, 25.4 mm, sliding speed, 50.8 mm/s, and average normal force, 251.4 N. The result are as follows: initial wear rate $5.6\times10^{-5}$ mm$^3$/Nm at 1000 cycles, best wear rate $1.2\times10^{-7}$ mm$^3$/Nm at 1,000,000 cycles, total wear rate $1.3\times10^{-7}$ mm$^3$/Nm at 1,100,000 cycles, uncertainty in total wear rate, $1.4\times10^{-9}$ mm$^3$/Nm, average friction coefficient, 0.21, and volume lost, 2.42 mm$^3$. FIG. 4 illustrates a graph illustrating the Volume Loss v. Normal Force*Distance for this sample. The supplier specified pyrophyllite composition was about 40% pyrophyllite with impurities of quartz (about 50-60%), mica and kaolin.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measuring technique and the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

At least the following is claimed:

1. A method for making an article, comprising:
    mixing a fluoropolymer with a filler to form a mixture, wherein the filler is selected from the group consisting of: mullite, pyrophyllite, kyanite, dolomite, and a combination thereof, wherein the fluoropolymer is about 75 to 95 weight % of the mixture, wherein the filler is about 5 to 25 weight % of the mixture; and
    forming a compression mold of the mixture.

2. The method of claim 1, wherein the fluoropolymer is polytetrafluoroethylene.

3. The method of claim 2, wherein the filler is selected from the group consisting of: mullite, pyrophyllite, kyanite, and dolomite.

4. An article, comprising:
    a mixture derived from a fluoropolymer and a filler, wherein the filler is pyrophyllite, wherein the fluoropolymer is about 75 to 95 weight % of the mixture, wherein the filler is about 5 to 25 weight % of the mixture, wherein the article has one of: a coefficient of friction of about 0.22 to 0.26, wherein conditions for measuring the coefficient of friction are as follows: a counterface on which a sample was tested is 304L stainless steel lapped and testing parameters are: reciprocating length, 25.4 mm, sliding speed, 50.8 mm/s, and average normal force, 274.1 N; or a wear rate of about $5\times10^{-7}$ mm$^3$/Nm or less, wherein the conditions for measuring the coefficient of friction are as follows: the counterface on which the sample was tested is 304L stainless steel lapped and the testing parameters are: reciprocating length, 25.4 mm, sliding speed, 50.8 mm/s, and average normal force, 274.1 N; or both.

5. The article of claim 4, wherein the fluoropolymer is polytetrafluoroethylene.

6. An article, comprising:
a mixture derived from a fluoropolymer and a filler, wherein the filler is kyanite, wherein the fluoropolymer is about 75 to 95 weight % of the mixture, wherein the filler is about 5 to 25 weight % of the mixture, wherein the article has one of: a coefficient of friction of about 0.3 to 0.34, wherein conditions for measuring the coefficient of friction are as follows: a counterface on which a sample was tested is 304L stainless steel lapped and testing parameters are: reciprocating length, 25.4 mm, sliding speed, 50.8 mm/s, and average normal force, 257.3 N; or a wear rate of about $4 \times 10^{-7}$ mm$^3$/Nm or less, wherein the conditions for measuring the coefficient of friction are as follows: the counterface on which the sample was tested is 304L stainless steel lapped and the testing parameters are: reciprocating length, 25.4 mm, sliding speed, 50.8 mm/s, and average normal force, 257.3 N; or both.

7. The article of claim 6, wherein the fluoropolymer is polytetrafluoroethylene.

8. An article, comprising:
a mixture derived from a fluoropolymer and a filler, wherein the filler is dolomite, wherein the fluoropolymer is about 75 to 95 weight % of the mixture, wherein the filler is about 5 to 25 weight % of the mixture, wherein the article has one of: a coefficient of friction of about 0.29 to 0.33, wherein conditions for measuring the coefficient of friction are as follows: a counterface on which a sample was tested is 304L stainless steel lapped and testing parameters are: reciprocating length, 25.4 mm, sliding speed, 50.8 mm/s, and average normal force, 251.4 N; or a wear rate of about $9.3 \times 10^{-8}$ mm$^3$/Nm or less, wherein the conditions for measuring the coefficient of friction are as follows: the counterface on which the sample was tested is 304L stainless steel lapped and the testing parameters are: reciprocating length, 25.4 mm, sliding speed, 50.8 mm/s, and average normal force, 251.4 N; or both.

9. The article of claim 8, wherein the fluoropolymer is polytetrafluoroethylene.

10. The method of claim 1, wherein the filler is mullite.

11. The method of claim 1, wherein the filler is pyrophyllite.

12. The method of claim 1, wherein the filler is kyanite.

13. The method of claim 1, wherein the filler is dolomite.

* * * * *